United States Patent [19]

Anzai

[11] Patent Number: 5,598,513
[45] Date of Patent: Jan. 28, 1997

[54] COLOR RECORDING APPARATUS AND PROCESS THEREFOR

[75] Inventor: Katsuhiko Anzai, Tokyo, Japan

[73] Assignee: Canon Kabushiki Kaisha, Tokyo, Japan

[21] Appl. No.: 301,035

[22] Filed: Sep. 6, 1994

Related U.S. Application Data

[63] Continuation of Ser. No. 967,236, Oct. 27, 1992, abandoned.

[30] Foreign Application Priority Data

Nov. 1, 1991 [JP] Japan ................................. 3-288055

[51] Int. Cl.$^6$ ................................................ G06H 15/00
[52] U.S. Cl. ..................... 395/109; 395/117; 395/112
[58] Field of Search ................................. 395/101, 109, 395/115, 116, 117, 131, 112; 358/540, 517, 523, 518; 400/61, 62, 63, 67, 76

[56] References Cited

U.S. PATENT DOCUMENTS

| | | | |
|---|---|---|---|
| 5,020,004 | 5/1991 | Igarashi | 395/109 |
| 5,045,967 | 9/1991 | Igarashi . | |
| 5,067,024 | 11/1991 | Anzai | 358/296 |
| 5,157,417 | 10/1992 | Anzai | 346/108 |

FOREIGN PATENT DOCUMENTS 2614124  10/1988  France ................................ G06K 3/00

OTHER PUBLICATIONS

Patent Abstracts of Japan, vol. 013512 (kokai 1–206052) Aug. 1989.
Patent Abstracts of Japan, vol. 015272 (kokai 3–092364) Apr. 1991.

*Primary Examiner*—Arthur G. Evans
*Attorney, Agent, or Firm*—Fitzpatrick, Cella, Harper & Scinto

[57] ABSTRACT

A color printing apparatus for printing information data as well as overlay data. A data receiving means receives information data and overlay data, and a notifying device notifies an operator that overlay printing is to be performed. A manual overlay color setting device manually sets a printing color of the overlay data received by the data receiving device. The manual overlay color device is used to set the desired color in which the overlay data is to be printed by over-riding instructions from a computer for overlay color selection. A printing device prints the overlay data based on the color defined by the manual overlay color setting device and the information data received by the data receiving device.

20 Claims, 17 Drawing Sheets

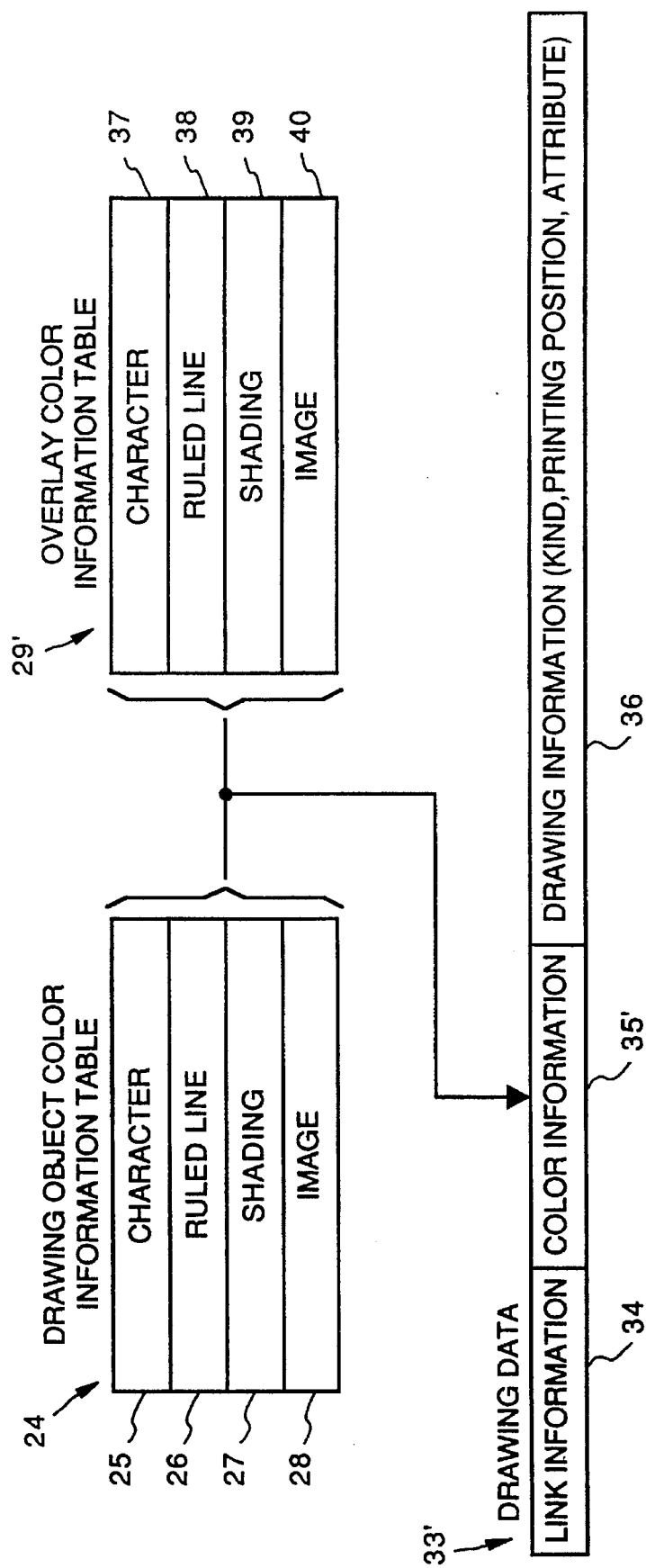
F I G. 13

COLOR RECORDING APPARATUS AND PROCESS THEREFOR

This application is a continuation of application Ser. No. 07/967,236, filed Oct. 27, 1992, now abandoned.

BACKGROUND OF THE INVENTION

The present invention relates to a color recording process and color recording apparatus.

A conventional color recording apparatus outputs a color document based on a color designation given by control commands sent from a host computer to a color printer. However, when overlay data is to be printed, there is no color designation by the application software, consequently, the overlay is limited to being printed in black.

SUMMARY OF THE INVENTION

The present invention provides a process and apparatus for printing overlay data for a form, prepared by application software which does not consider coloring of such overlay. Furthermore, if the printout is to be made on colored paper, it is necessary to print the overlay in a color different from the sheet color to insure clarity and ease in distinguishing lines, characters, and other features of the overlay. In order to provide for such capability, the color recording process provides for both printing data and overlays to be color controlled by a predetermined assigned color. In the case of data, the color is controlled by control commands in the information being received.

In the case of overlays, the color is predesignated by a printer side through a control panel. Color designation for each recording page is possible. Note that in many cases, the data is recorded on a colored sheet. The only person who definitely is aware of the sheet color is the operator at the recording device. Therefore, to insure that the recorded output is clearly readable, an appropriate color overlay should be used. This color can be assigned, for each page, by the operator through the control panel.

In addition, by being able to assign overlay color at the control panel of the recording device, it is possible to print the overlay with a color that is difficult to reproduce. Thus, although the overlay is visible and readable in its original form, it will disappear when reproduced by a copying device. By this method, a certain degree of secrecy can be maintained since the data alone, without the overlay, may be rendered meaningless.

One aspect of the present invention relates to a color recording apparatus for receiving an external color designation, performing assignment of the colors, and developing of output data for drawing data as well as a specific type of data, comprising data receiving means for receiving printing data containing overlay color input request; color setting means for responding to the overlay color input request received by data receiving means; and printing data developing means for developing the print data based on color defined by color setting means.

Another aspect of the present invention relates to a color recording apparatus for receiving an external color designation, performing assignment of color and developing of output data for drawing data as well as for a specific type of data, comprising data receiving means for receiving printing and overlay color data and related command; color setting means for setting the print colors specified in the command portion of the data received in the data receiving means; and printing data developing means for developing the print data based on color defined by color setting means.

A further aspect of the present invention relates to a color recording apparatus for receiving a color designation, performing an assignment of color and developing of output data for drawing data as well as for a specific type of data, comprising data receiving means for receiving data from external source; analyzing means for analyzing the received data into internal color drawing data; first memory means for storing the color drawing data; second memory means for storing color drawing data for specific type of color data; discriminating means to discriminate normal printing data from other data according to the color designated by an external source; and bit map developing means to develop a bit map from color drawing data and a specific type of color data.

Yet further aspects of the present invention relate to a process of receiving an external color designation, performing assignment of the colors, and developing of output data for drawing data as well as a specific type of data, comprising a step of receiving printing data containing an overlay color input request; a step of responding to the overlay color input request received by a data receiving means; and a step of developing the print data based on color defined by a color setting means. A process of receiving external color designation, performing assignment of color and developing of output data for drawing data as well as for specific type of data, comprising a step of receiving printing and overlay color data and related command; a step of setting the print colors specified in the command portion of the data received in the data receiving means; a step of developing the print data based on a color defined by color setting means.

According to the present invention, by providing a color designating means through control panel switches or in the case of external control, by commands, form overlay data prepared by an application software which does not consider color, can be colored in a color recording apparatus for color recording.

Further objects, features and advantages of the present invention will become apparent from the following detailed description of embodiments of the present invention with reference to the accompanying drawings.

BRIEF DESCRIPTION OF THE DRAWINGS

The detailed description explanation will utilize the following figures:

FIG. 13 illustrates a color information table and drawing data according to a second embodiment;

DETAILED DESCRIPTION OF THE PREFERRED EMBODIMENTS

First Embodiment

The first embodiment is hereafter described with reference to the drawings.

Figure 1:
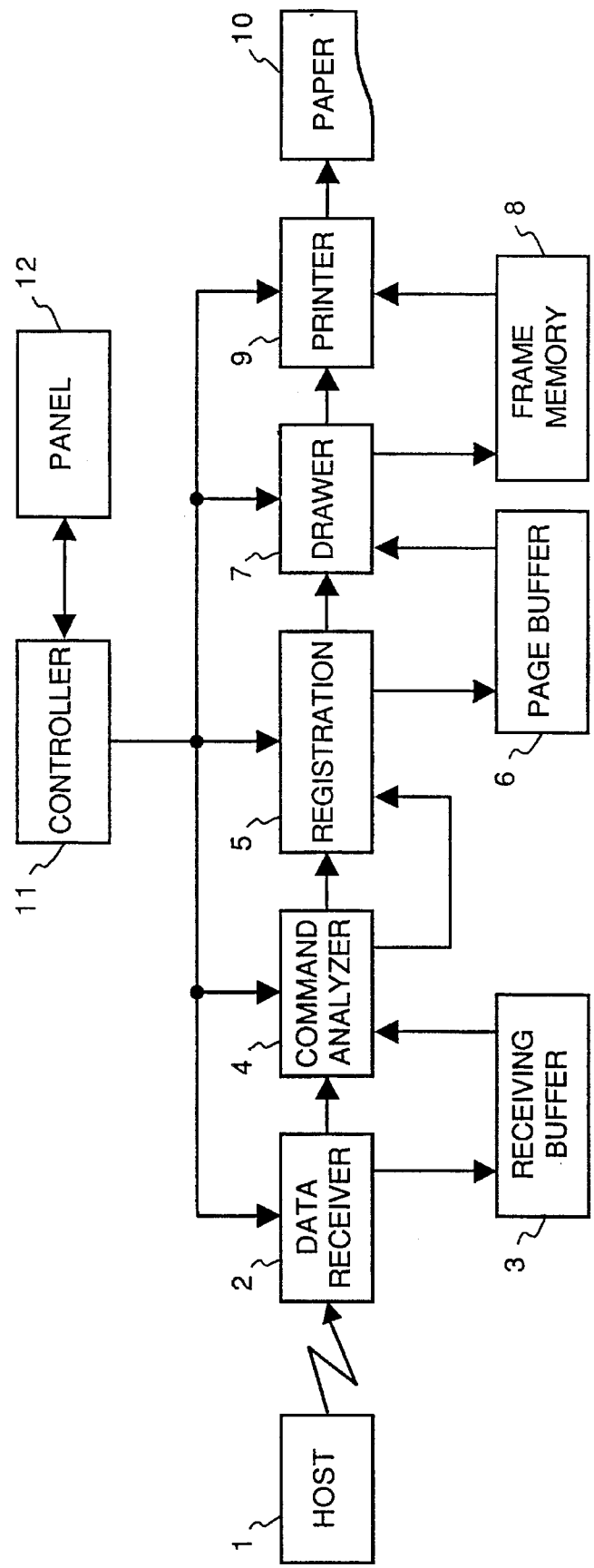
FIG. 1 illustrates a block diagram of a basic structure of the color recording apparatus of a first preferred embodiment of this invention.

FIG. 1 is a block diagram illustrating the basic structure of the color recording apparatus of the preferred embodiment of the invention.

In FIG. 1, an externally connected equipment, for example, a host computer 1, which is connected to transmit data to a recording apparatus and is used for executing application software. A data receiver 2 receives commands and data transmitted to the recording apparatus, the data is then stored in a receiving buffer 3. A command analyzer 4, first reads out the received data from the buffer 3 and then analyzes the instruction commands to convert the received data into internal drawing data. The analyzer 4 discriminates and separates the overlay data from normal data. According to this discrimination process, a flag or parameter for managing overlay data is set.

A registration 5 stores and manages the converted drawing data according to the parameter and flag set, which is used for controlling the overlay data. Here, the normal data which does not include overlay data is defined as a data for printing text data.

Normal data is registered in a drawing information area 33 (refer to FIG. 5) and is controlled by a page control table 14 (hereinafter referred to as normal PCT). Overlay data is also registered in the drawing information area 33 and controlled by a PCT (Page Control Table) 19. The entire drawing data controlled by the PCT is defined as page buffer 6.

A drawer 7 reads out drawing data from the page buffer 6 and develops the drawing data as bit map image which is stored in frame memory 8, in conformance with the color information. A printer 9 prints the bit map image data stored in the frame memory 8 onto a color recording paper 10.

A controller 11 controls all of the recording apparatus and its main function is to control each element of the recording apparatus. In addition, the controller 11 is equipped with a communication facility. Panel switches 12 are used to designate coloring of the overlay data for the analyzing means 4 via controller 11. Due to the manipulation of these switches, the overlay data of page 1 may, for example, be designated brown and the overlay data of page 2 may be designated red.

Figure 2:
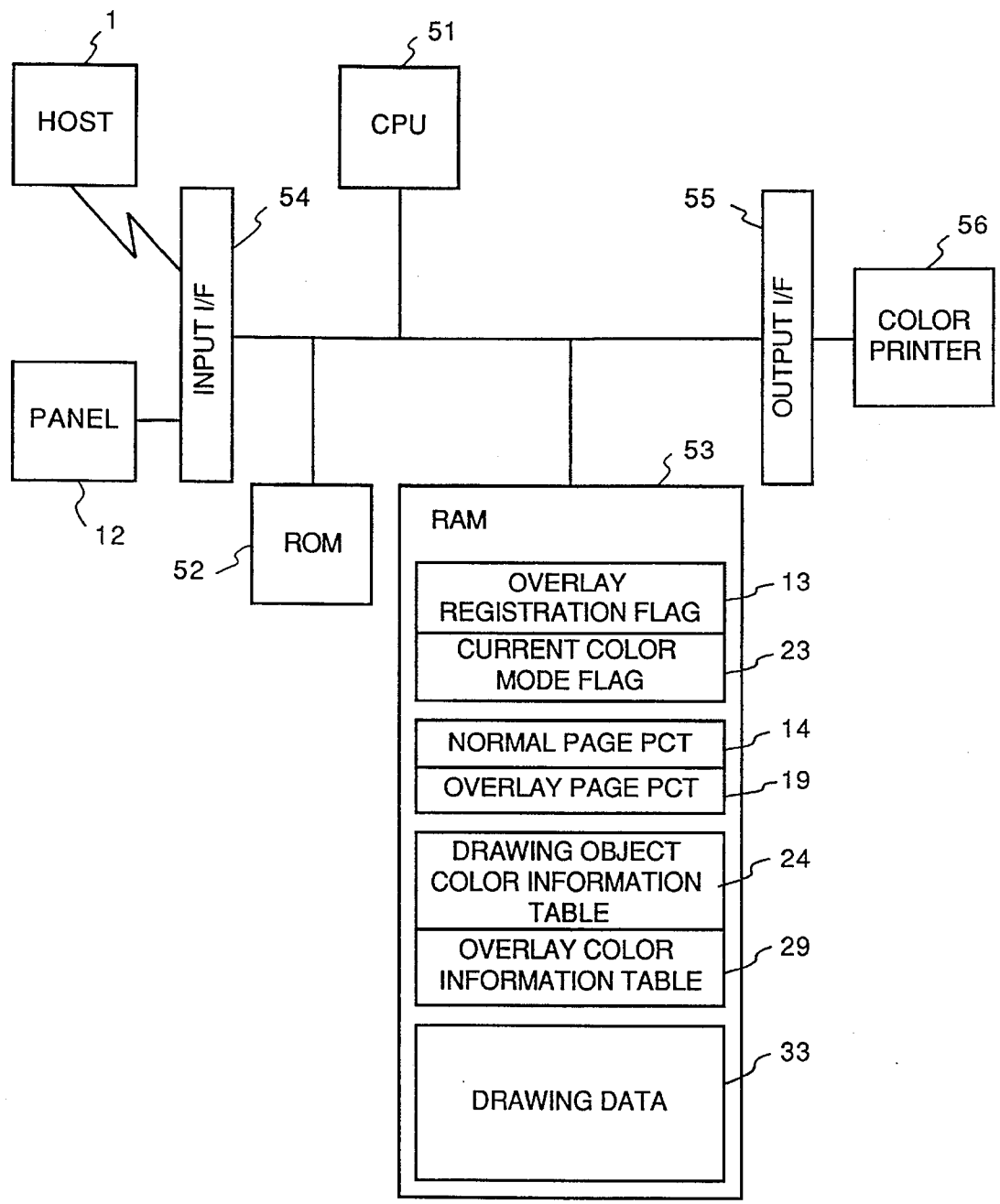
FIG. 2 is a block diagram used to explain the hardware structure, memory and memory allocation of the apparatus of FIG. 1.

FIG. 2 is a block diagram used to explain the hardware structure of the recording apparatus of the first embodiment. With reference to a stored program in ROM 52, preparation of drawing data 33 with command analyzing 4, registration unit 5 and drawer 7, will be discussed below.

As illustrated in FIG. 2, a CPU 51 is connected to a ROM 52, RAM a 53 and input/output interfaces (I/F) 54 and 55 via a bus. External equipment 1 and panel 12 are connected to the input interface 54 and a color printer 56 is connected to output interface 55. The normal page PCT and the overlay page PCT are provided in the RAM 53.

When the data analyzed by the command analyzer 4 is considered normal data, the normal page PCT is prepared. Alternatively, when the data is for an overlay page, the overlay page PCT is prepared (refer to FIG. 3). Flag 13 is provided to indicate an overlay registration in processing. The color mode flag 23 is also provided.

Figure 3:
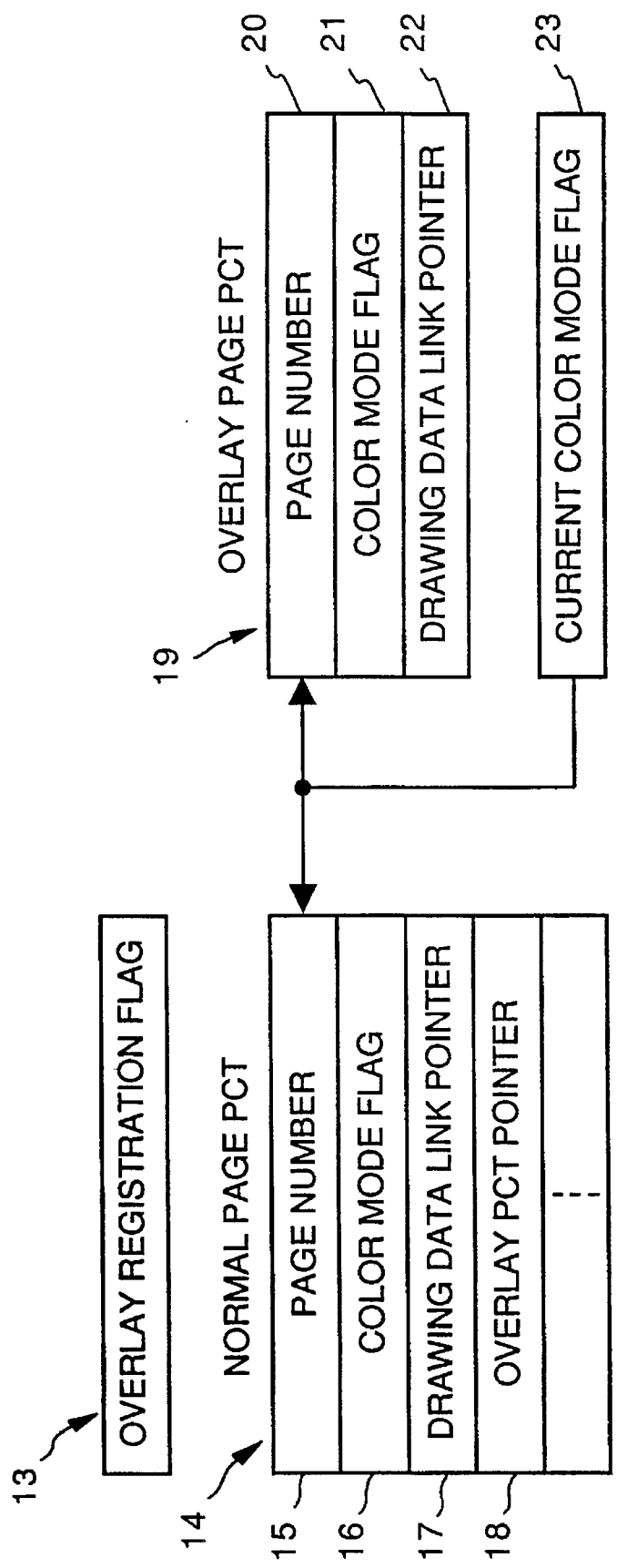
FIG. 3 is a diagram of the PCT's shown in FIG. 2.

FIG. 3 is an explanatory view of the PCT for control of a page. In accordance with whether Registration flag 13 is set or not, preparation of a normal page PCT 14 or overlay page PCT 19 is selected. In the arrangement of the normal page PCT 14, page number 15, color mode flag 16, drawing data link pointer 17, and overlay PCT pointer 18 are included. Overlay page number 20, color mode flag 21, drawing data link pointer 22 etc. are also included in the overlay page PCT 19.

Color mode flags 16 and 21 indicate whether the page is to be printed in multi color or single color, which are automatically set according to the set value of the current color mode flag 23. Drawing data link pointers 17 and 22 are the pointers for the management of drawing data 33. These pointers are used to refer to drawing data 33, when drawing data 33 is stored into the registration unit 5 and read out by the drawer unit 7.

Further, there are provided in RAM 53 the drawing object color information, table 24, in which color information is set according to the control commands from the outside and an overlay color information table 29 which memorizes overlay color information. Using the two PCT's 14 and 19 as well as the two color information tables 24 and 29, drawing data 33 is prepared. Drawing data 33 is provided for each PCT. A link information 34 is provided so as to make reference to the other drawing data.

Figure 4:
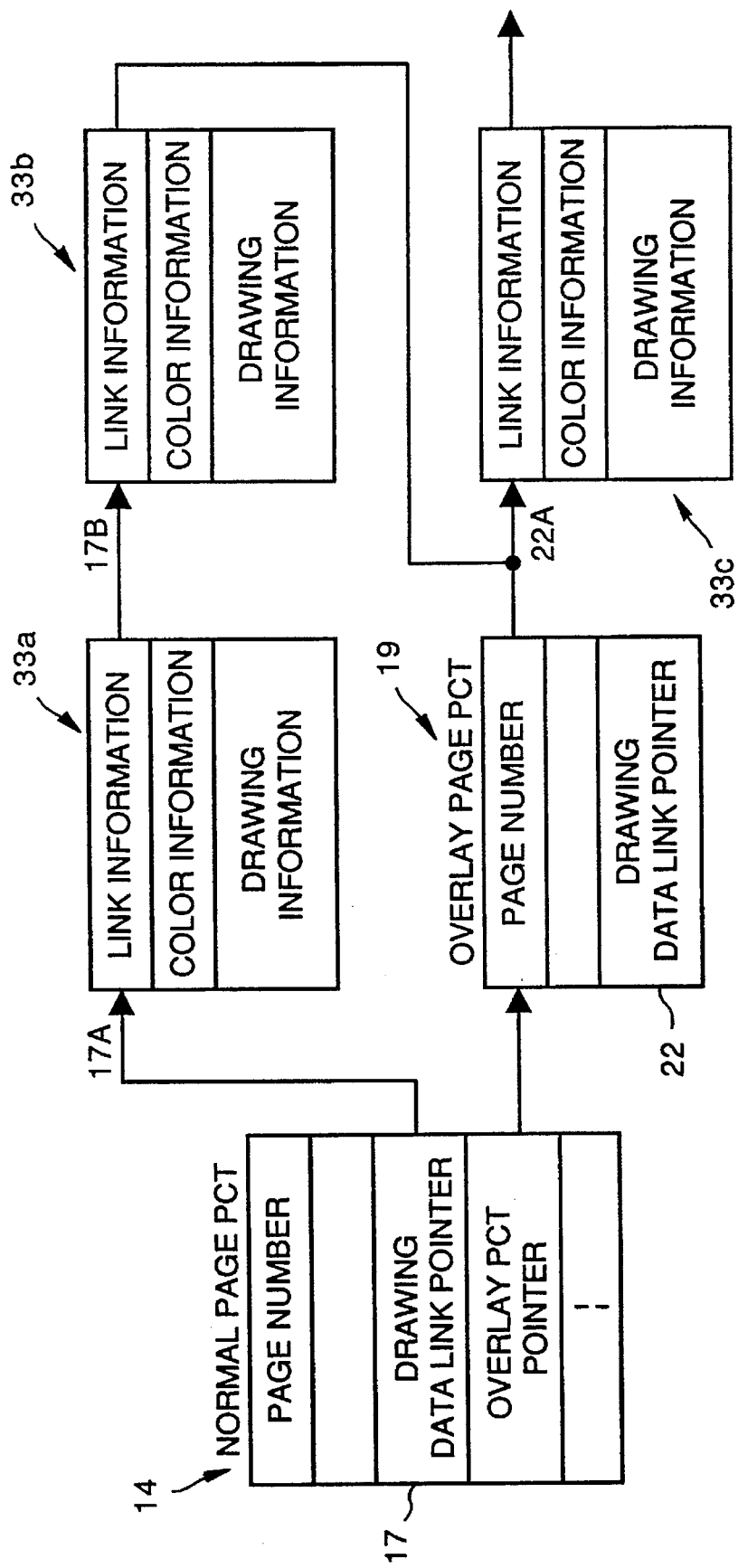
FIG. 4 is a diagram of a memory linking system as used in the invention.

Shown in FIG. 4 is an example of a memory cell linking system. In this diagram, three memory locations 17A, 17B and 22A are shown. Link pointer 17 points to memory location 17A as its drawing data 33a. Link pointer 22 points to memory location 22A as its drawing data 33c. Usually, the last memory location is linked to the first memory location 17A. In similar manner, the links can be extended as long as necessary to hold the desired information.

Figure 5:
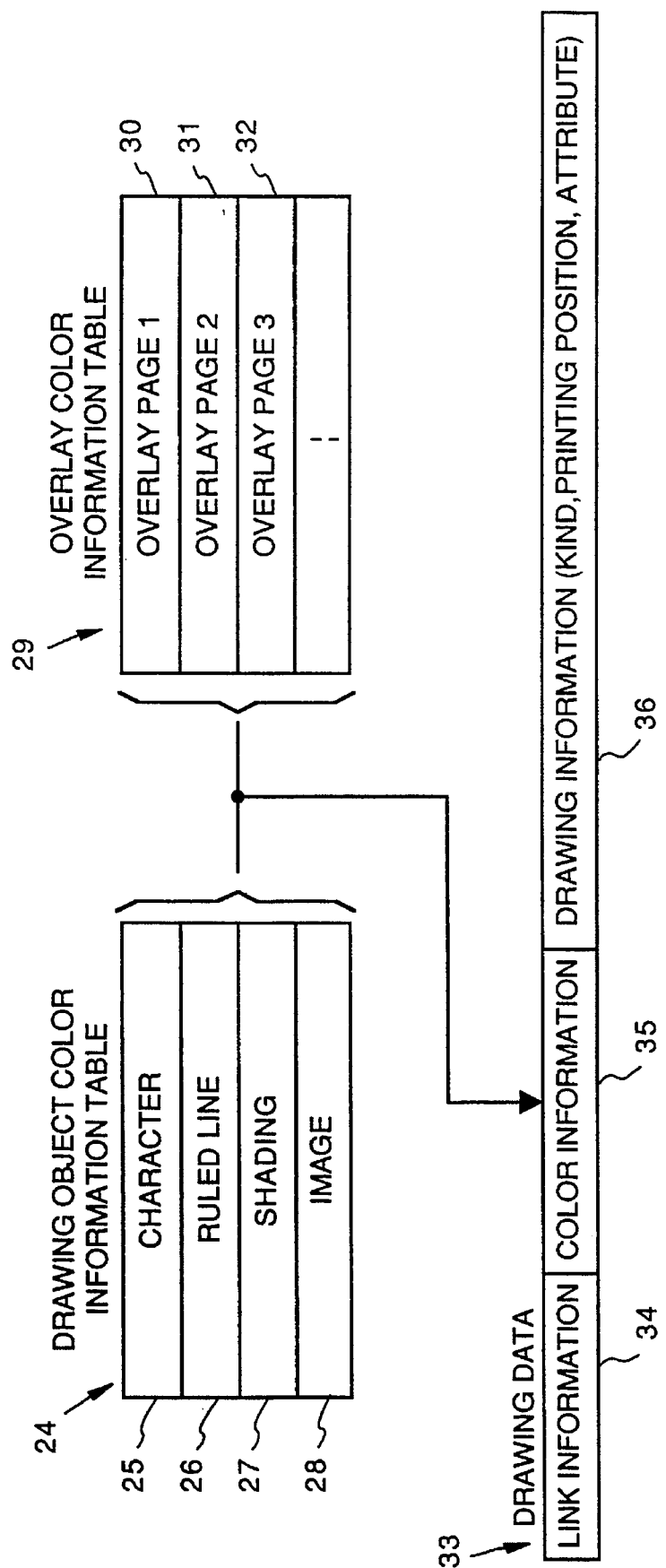
FIG. 5 is a diagram of the color tables shown generally in FIG. 2 as used to show the relationship between color, overlay and data.

FIG. 5 illustrates a relation between color information and the drawing information, where in the drawing object color information table 24, color information for the drawing objects such as a character 25, and ruled lines 26, are set by a control command. An overlay color information table 29 has the color overlay for each page set by the panel switches 12. In FIG. 5, the overlay color for page 1 to 3, items 30, 31 and 32 are registered. A structure 33 is an example of the drawing data. One drawing data is comprised of link information 34, color information 35 on the drawing object and drawing information 36, including the kind of drawing, printing position and an attribute of the drawing.

With the above arrangements, a procedure for coloring of the overlay data will be discussed with reference to flow charts shown in FIGS. 6 to 12. Before color selection can be made, the host must notify the operator that one or more overlays will be sent and that the operator must select appropriate colors for these overlays. Appropriate means for notification, such as a display and an alarm, can be on the control panel 12 for this purpose.

Figure 6:
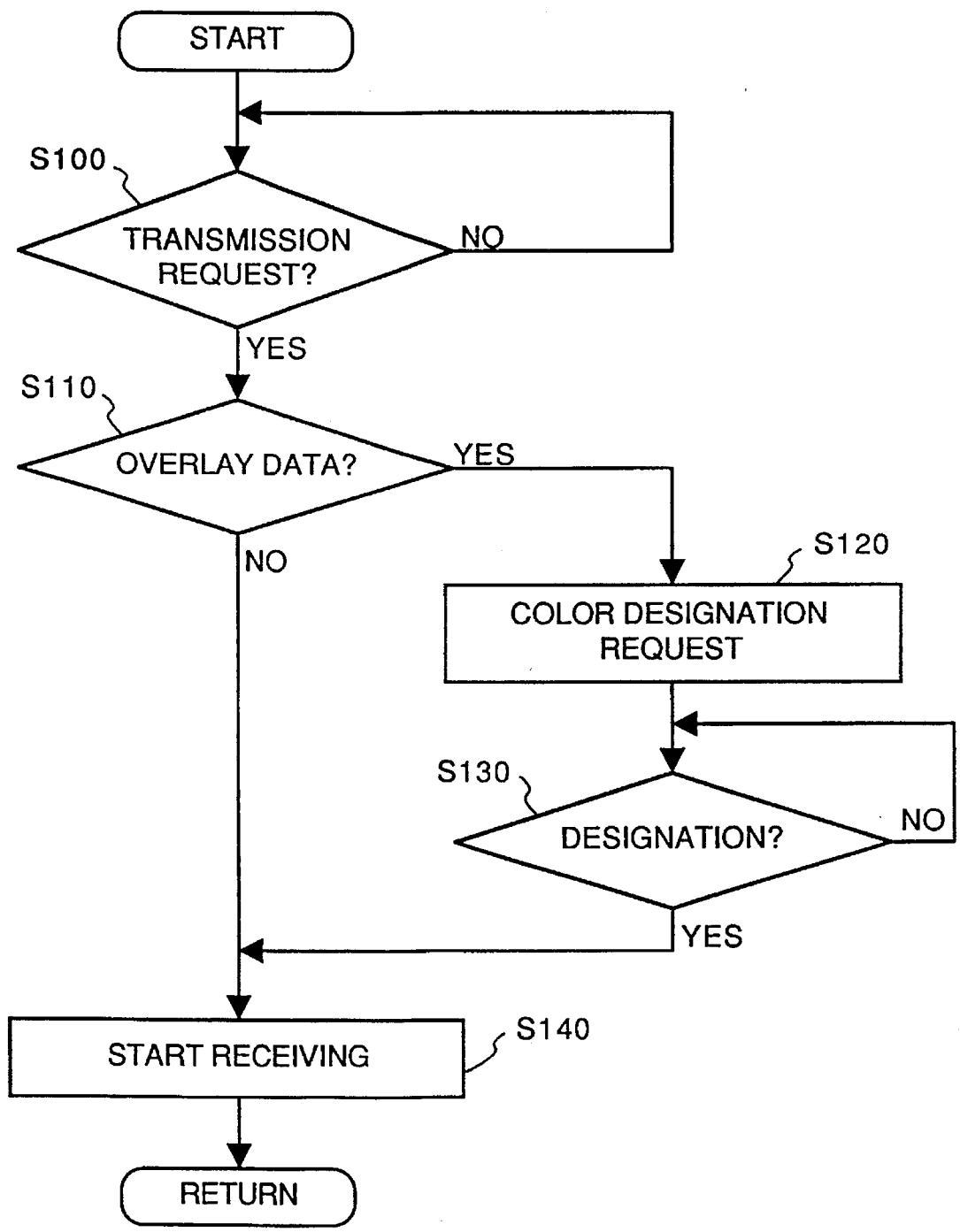
FIG. 6 show a flow chart illustrating communication between a host computer and a printer.

FIG. 6 illustrates a preferred flow chart as observed from a printer device side. In step S100, a printer checks if a host computer asked to transmit printing data. If not, it waits until the printer receives such request. If so, a control goes to step S110 and checks if an overlay data is included in the received data. If the overlay data is included, the printer requests the operator to designate the overlay color (step S120). Color designation is confirmed in step S130, and the printer becomes ready to receive printing data from the host computer (step S140).

Figure 7A:
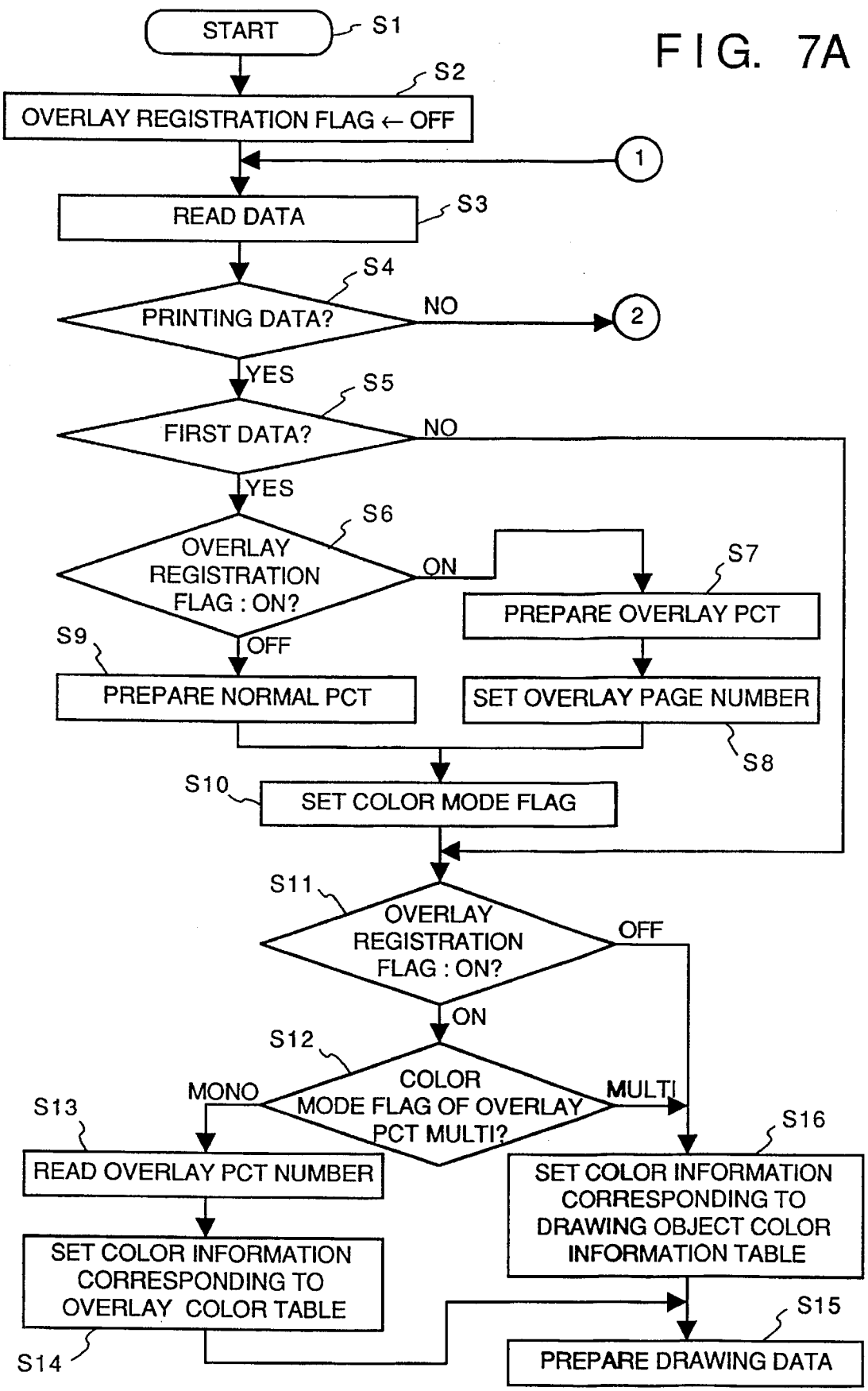
FIGS. 7A and 7B are flowcharts illustrating a coloring process according to the first embodiment.
Figure 7B:
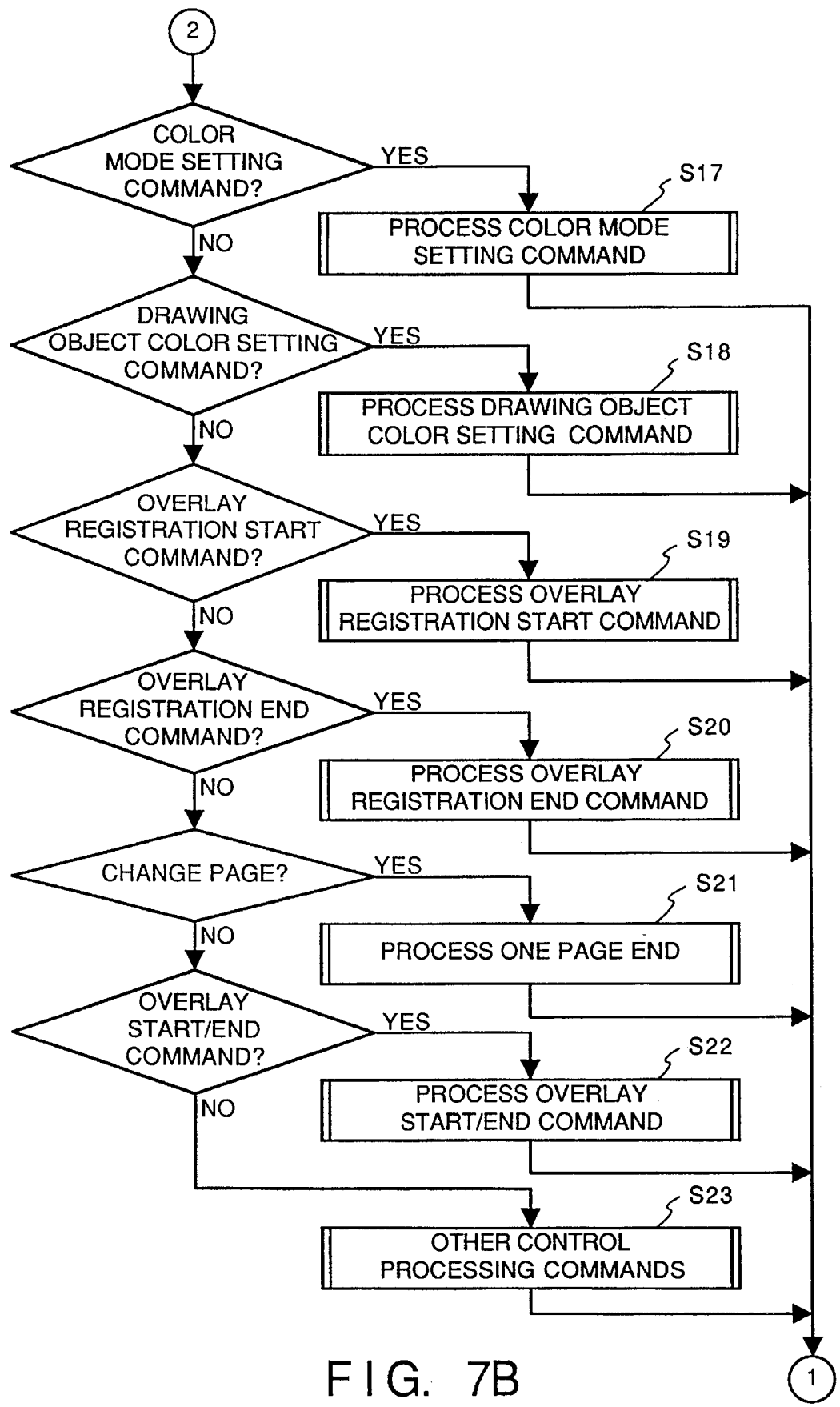

In FIG. 7A, before starting the processing of the recording, the flag for overlay processing is reset to OFF(S2), other parameters are also initialized. If the overlay data not having a color attribute is received from the external equipment with the data receiver 2, the data is stored in the receiving buffer 3. The stored received data is read and analyzed by the analyzing unit 4 (S3), and the received data is analyzed to determine if it is printing data (S4). If it is determined as non-recording data, the attribute of the data is judged as an instruction command and appropriate processing according to the command is performed. (S17 to S23 is discussed later). If the data is determined to be printing data, further discrimination is performed to determine if the data is the first data on the page (S5). If the data discriminated is the first data, the processing mode is checked with the status of the overlay registration processing flag 13 (S6). If OFF is discriminated for the FLG (S6), a PCT for a normal page is prepared S9. Alternatively, if FLG is ON, an overlay page PCT 19 is prepared (S7), and also overlay page number is set (S8). Next, the current color mode FLG 23 is read and regardless of the status, the color mode FLG's 16 and 21 are accorded with the FLG 23 (S10).

If the data is not the first data of the page, whether overlay registration processing is performed or not is discriminated. If the registration processing is discriminated, control goes to step S12 where the color mode FLG 21 in PCT 19 is referred to, to determine if multi color printing is required. If mono-printing (single color) is discriminated, the overlay page number 20 in PCT 19 is referred to so as to read the color information from the overlay color table 29 (S13 and S14). Then the read out color information is used for drawing color information 35 which is one of the elements of drawing data 33 (S15). If the overlay processing is not discriminated at step S11, as color designation is included in the data, a color information corresponding to the drawing object is read from the drawing object color information table 24 and is taken as drawing color information 35 as one of the element of drawing data 33 (S16).

The above discussion relates to control flow for drawing data preparation. A further detail discussion on control commands for setting necessary flags will be discussed with reference to FIGS. 7B to 12.

Figure 8:
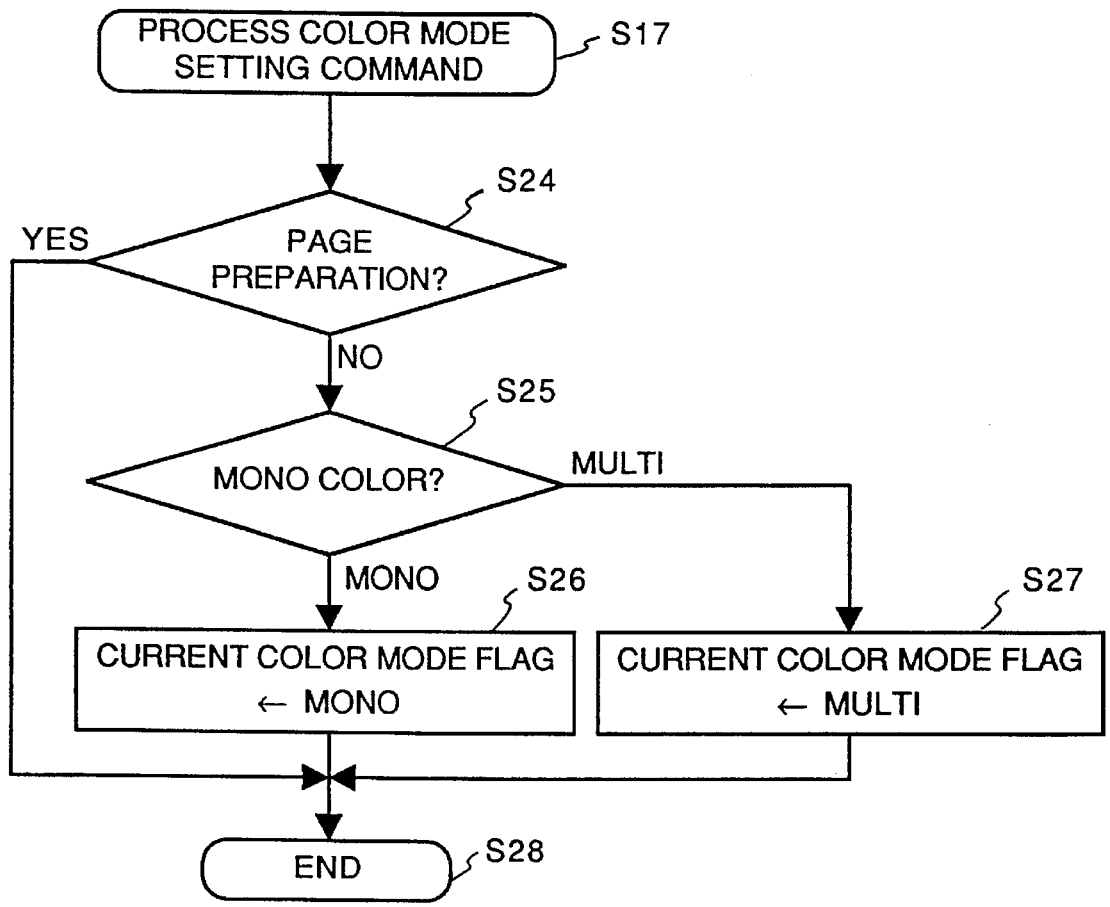
FIG. 8 is a flow chart illustrating a color mode setting process.

Regarding the process on the color mode setting command (S17), it is discriminated if a page is being preparing at that instance (S24 in FIG. 8). If the processing is discriminated, the step is not performed, in order to avoid change of color while in processing for the page (S28). If not in the processing, color designation is discriminated if mono color is set in the current color mode flag 23 (S26), multi color is set in the color mode flag 23 in case of a "multi color designation" (S27).

Figure 9:
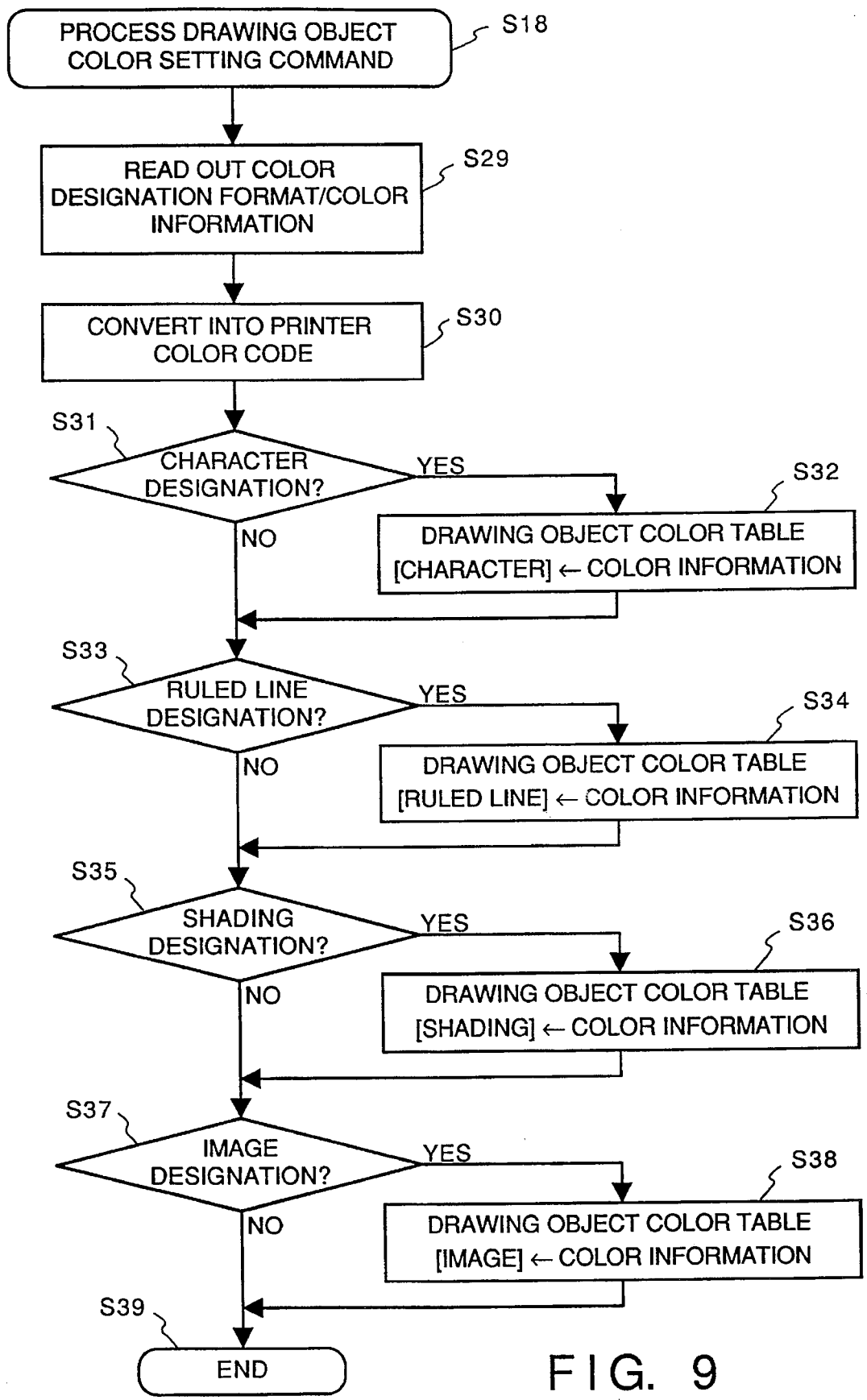
FIG. 9 is a flow chart illustrating a drawing object current color designation command process.
Figure 10:
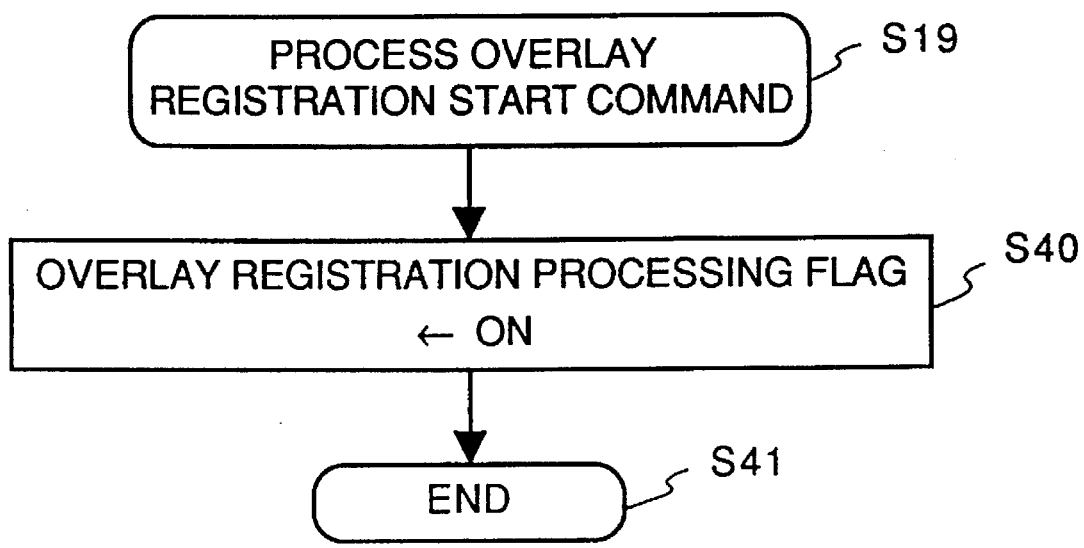
FIG. 10 is a flow chart illustrating an overlay registration initiating command process.
Figure 11:
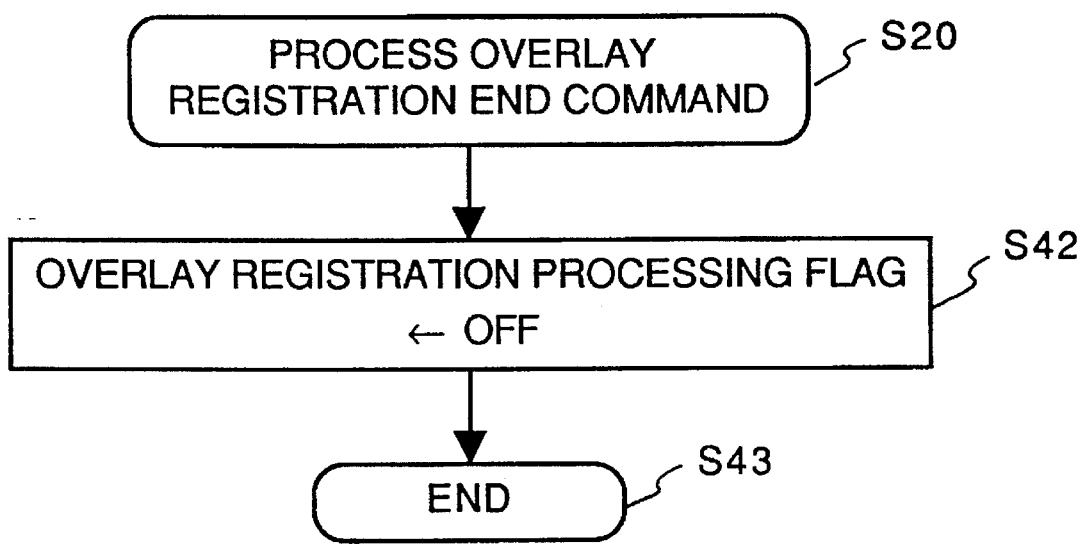
FIG. 11 is a flow chart illustrating an overlay registration and command process.
Figure 12:
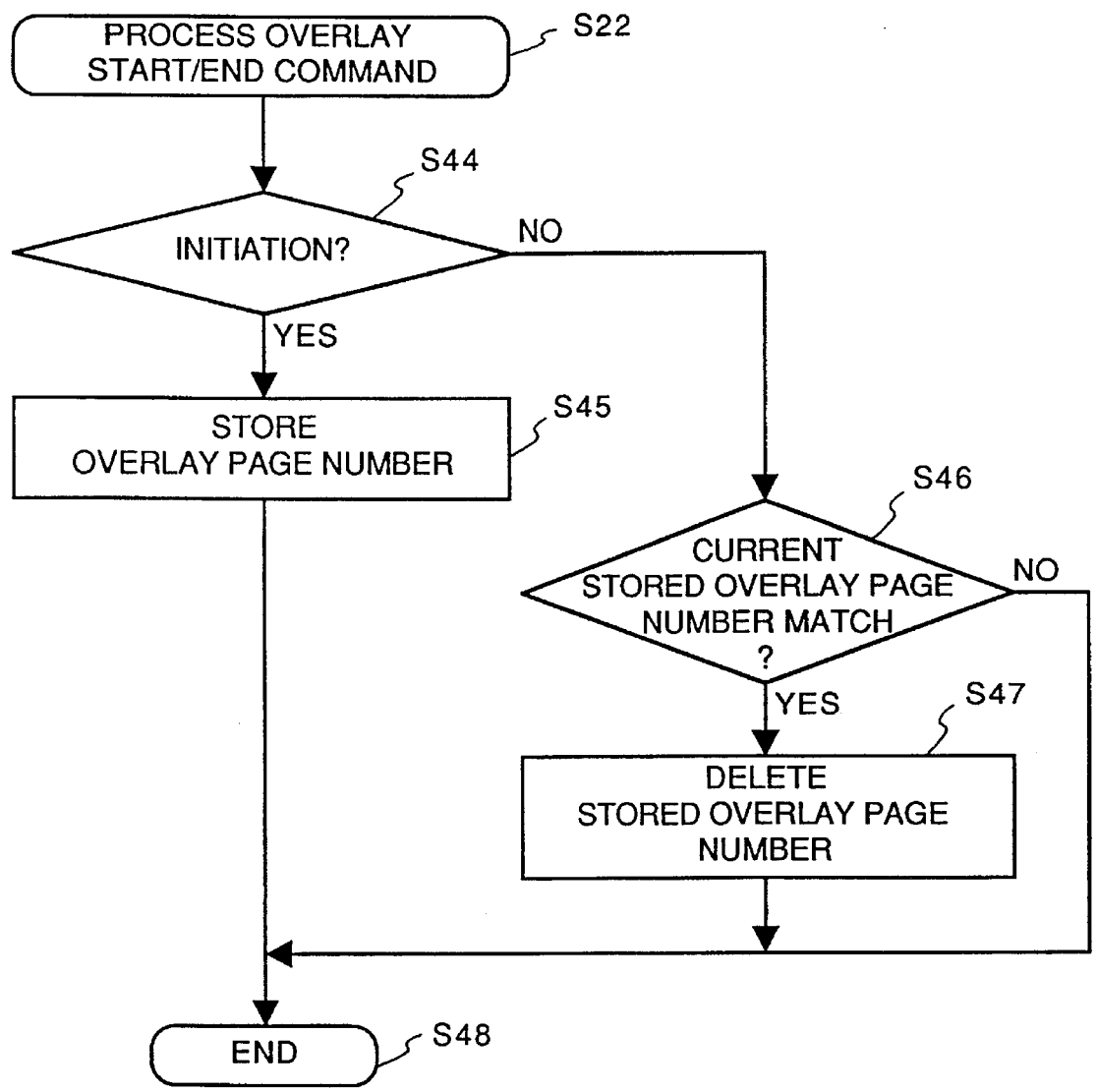
FIG. 12 is a flow chart illustrating an overlay initiation and/or termination command process.

In the drawing object color setting command processing (S18), a color designation format and a color information are read out from the command (S29 in FIG. 9). An external expression on the color information is converted into the printer color code (S30). If characters are included in the drawing object designated by the commands, internally converted color information is set in the character color information (S32). If a ruled line (S33), internally converted color information is set for the ruled line color information in the drawing objection color information table by step (S34). If shading is designated (S35), an internally converted color information is set for the shading color information in the shade color information table by step (S36). If an image is designated (S37), the appropriate color information is set in the image color information table by step (S38), then this routine is ended by step (S39).

In the step for processing the overlay registration start command (S19), the overlay registration processing flag 13 is set to ON (S40 in FIG. 10) and ends (S41).

In the step for processing the overlay registration end command (S20), the overlay registration processing flag 13 is set to OFF (S42 in FIG. 11) and ends at (S43).

In the step for processing the overlay start/end command (S22), the processing for initiation is first discriminated (S44 in FIG. 12) and if initiation thereof is discriminated, the page of the overlay is stored (S45) and then the processing ends (S48). If termination of the processing is discriminated, the overlay page number currently memorized is checked to see if it matches with the designated page number (S46), the stored overlay page number is deleted if there is accordance (S47). In the case where there is no according the number, no processing is performed (S48).

Regarding the one page end processing (S21), the address printing of the overlay PCT 19 is set in the overlay PCT pointer 18 in the normal page PCT 14 currently being prepared by referring to the overlay page number stored for overlay start command process (S22).

In a process for outputting data, analyzing unit 4 first completes to create the one page data, the controller 11 receives a notice with the address information of the completed normal page PCT 14. Upon receipt of the notice, the controller 11 starts drawer 7. Drawer 7 draws the drawing data 33 of the normal page PCT 14 designated by the controller 11. Within the drawing, if the overlay PCT pointer is set, overlay page PCT 19 overlay designated is drawn before drawing of the drawing data 33 of the designated normal page PCT 14.

As the color information 35 is included in the drawing data 33, bit map drawing 7 draws image (bit map developed) according to the color information in the conventional manner. After finishing the overlay PCT 19, the normal page PCT 14 is drawn. When the drawing for one page is completed, printer 9 prints out bit map memory data of the frame memory 8, for example, on a color OHP sheet, for example, with color.

In the above embodiment, the overlay color designation set with panel 12 or control command is set for each drawing record as color information, in case the command analyzer 4 discriminates single color over page. However, memory size can be reduced if single color overlay data as a command is provided in the set of the commands. In this arrangement, the function of the drawer must be expanded to the extent that it may interpret the command for single color designation for overlay data. Thus, the drawer 7 is designed and drawer 7 becomes available to each drawing data according to the color information designated in the color, if in the single color overlay page.

Second Embodiment

In the above embodiment, overlay color information table 29 is provided with each page. The overlay color information table 29 may be designed to store color information corresponding to the drawing object, as drawing object color information 24 is being constituted. In this second embodiment, drawing object color related information table 24, overlay color information table 29' and drawing data 33' are changed, as indicated in FIG. 13, in the relation of drawing object color information table 24, overlay color information table 29 and drawing data 33'. A control step for performing setting of color information in view of overlay color information table can be provided in lieu of steps S13 and S14 in the control flow of FIG. 7A.

Third Embodiment

Figure 14:
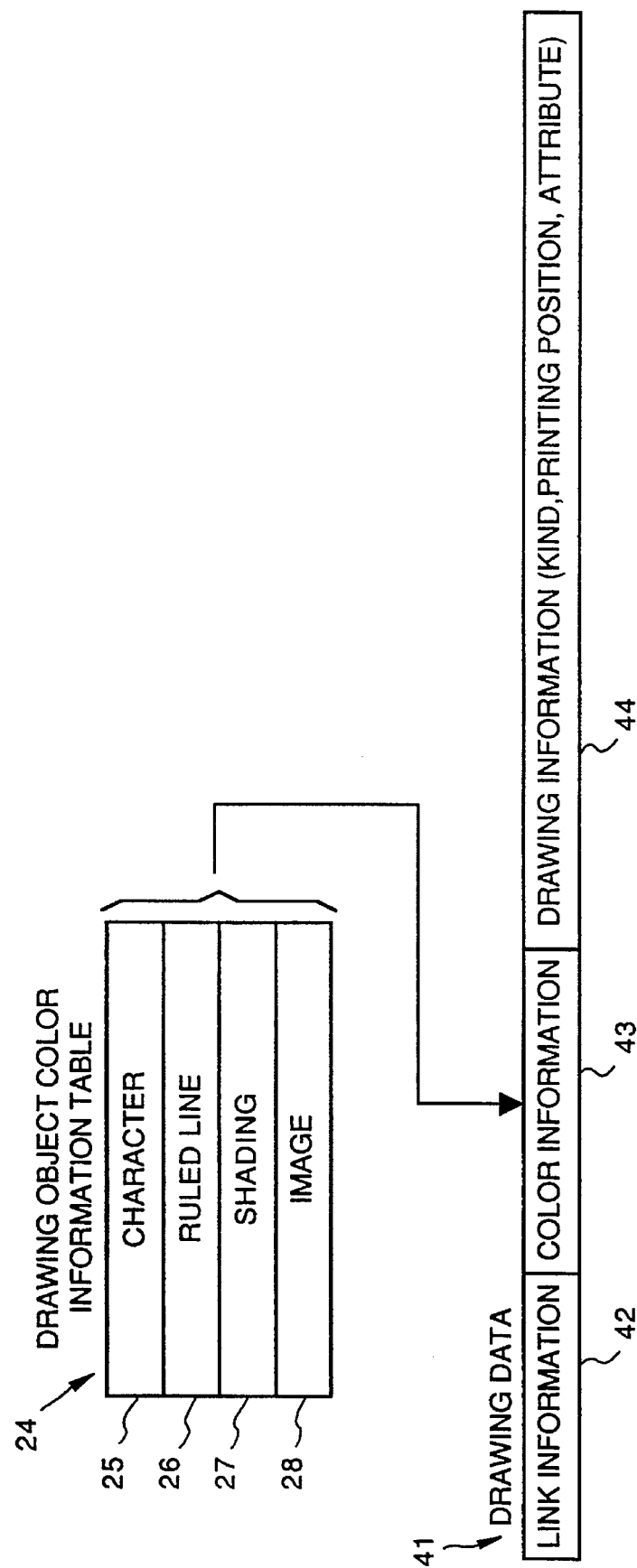
FIGS. 14 and 15 illustrate a color information table and drawing data according to a third embodiment.
Figure 15:
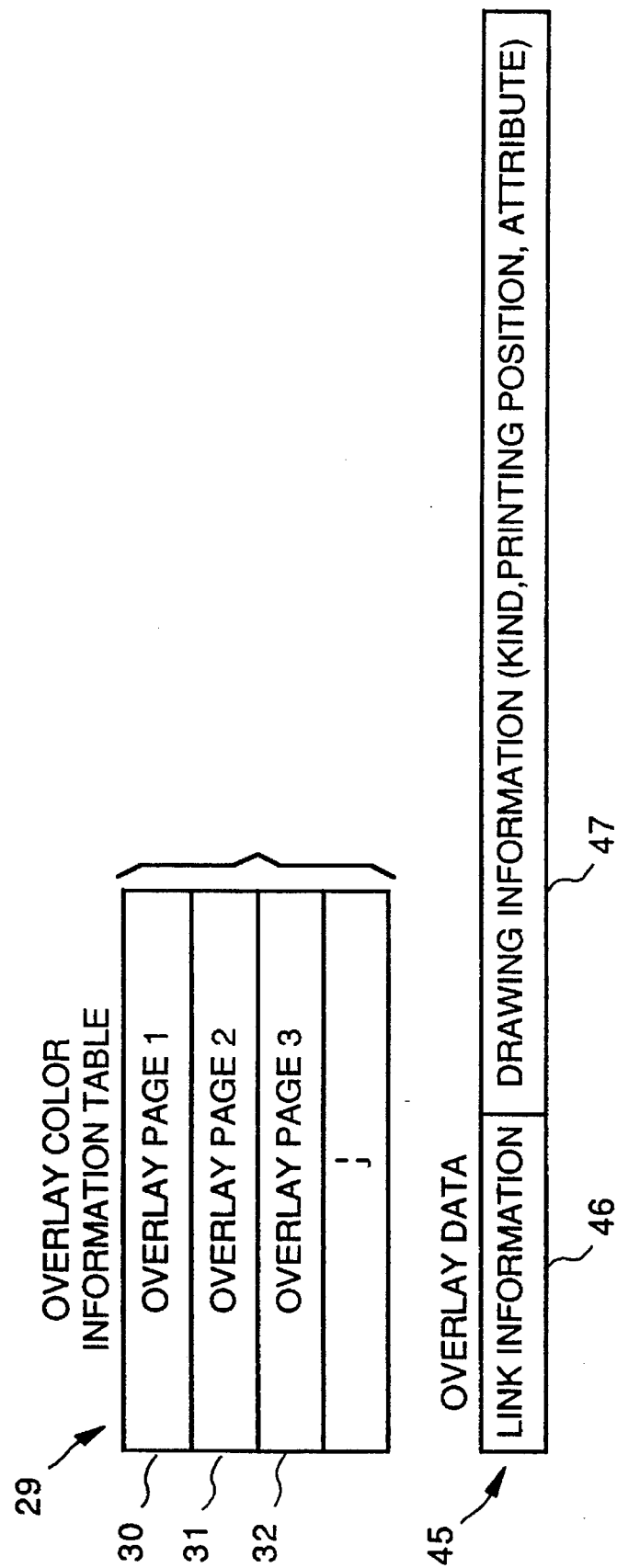

In the above embodiment, an arrangement for preparation of drawing data 33 by the drawer by employing the normal PCT 14, overlay PCT 19, drawing object color information table 24 and overlay color information table 29 is shown. However, it is possible to prepare drawing data 33 for each page by providing the drawing data for overlay by the overlay color information. In this embodiment, there is provided two kinds of drawing data as illustrated in FIGS. 14 and 15, where FIG. 14 illustrates a relation between the drawing object color information table 24 and the drawing data 41, and FIG. 15 illustrates a relation between the overlay color information and an associated overlay data. According to this embodiment, steps S13 and S14 in the flow chart of FIG. 7A become unnecessary. Two overlay data of FIG. 14 and 15 are to be referred in the preparation process for preparing the bit map data.

Fourth Embodiment

Figure 16:
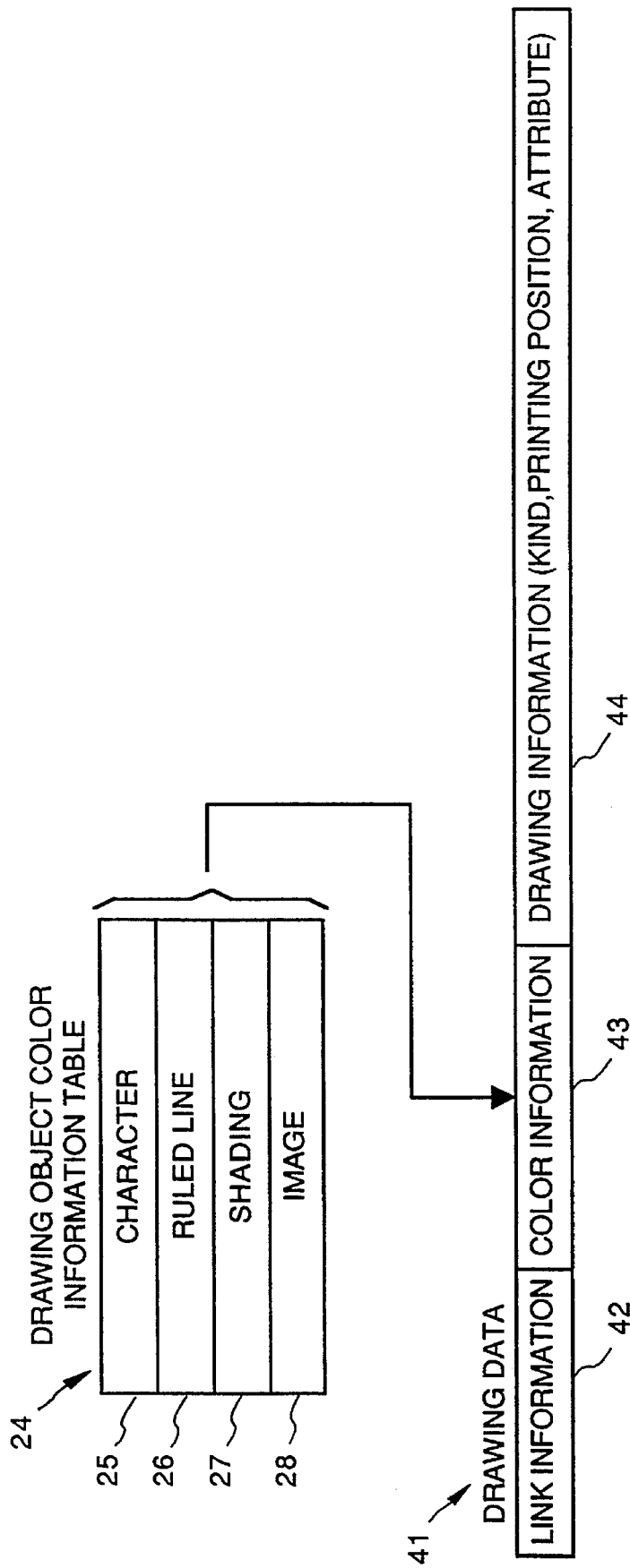
FIGS. 16 and 17 illustrate a color information table and drawing data according to a fourth embodiment.
Figure 17:
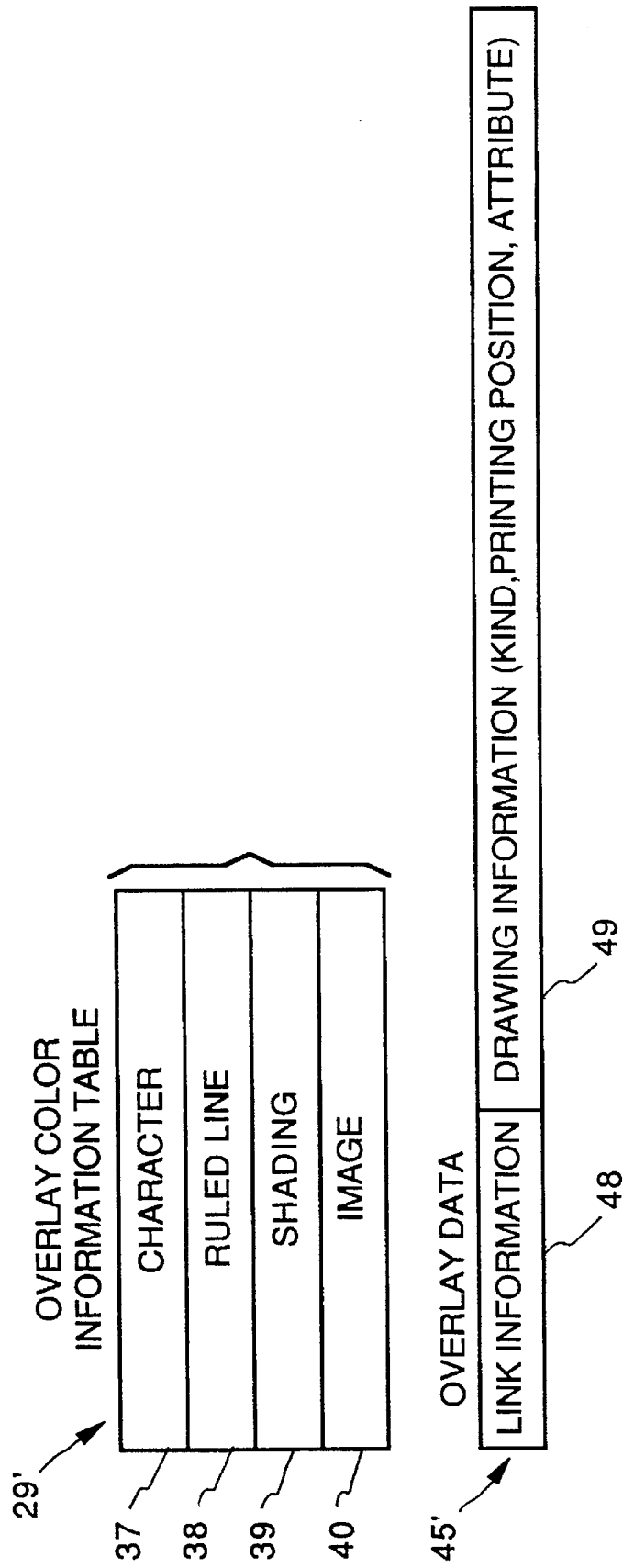

In the third embodiment, the overlay color information table 29 is provided for each page. However, in this embodiment, the overlay color information table 29 is designated to memorize color information corresponding to a drawing object as found in drawing object color information table 24. Relation of drawing object color information table 24 and drawing data 41 according to this embodiment is illustrated in FIG. 16. Relation of the overlay color information table 29 to the overlay data 45 is illustrated in FIG. 15. According to this embodiment, steps S13 and S14 of FIG. 7A become unnecessary, two drawing data of FIG. 15 and 16 are referred to in the preparation process of one frame of bit map data with drawer 7.

The present invention may be applied to a system constituted by a plurality of apparatus or to a single apparatus. Further, it goes without saying that the invention is applicable also to a case where a program for implementing the invention is supplied to a system or apparatus.

According to the present invention, when overlay data prepared by an application software is not applicable to a color application, the overlay data is printed with color.

That is, by providing a color designating means to an overlay data not having a color designation command, the overlay data prepared by conventional application software become possible to be printed in color.

The present invention is not limited to the above embodiments and various changes and modifications can be made within the spirit and scope of the present invention. Therefore, to apprise the public of the scope of the present invention the following claims are made.

What is claimed is:

1. A color printing apparatus for printing information data comprising:

data receiving means for receiving data and a color mode flag;

manual color information setting means for manually setting in a color information table printing color information of the data to be received by said data receiving means;

judging means for judging a state of the received color mode flag; and switching means for switching a print of the received data in a color designated by color information included in the received data or in a color designated by color information set in the color information table, in accordance with the judged state of the color mode flag.

2. The color printing apparatus according to claim 1, wherein said manual color setting means sets the printing color information in page units.

3. The color printing apparatus according to claim 1, wherein said manual color setting means sets the printing color information in defined units.

4. The color printing apparatus according to claim 1, wherein the receiving data and color mode flag are sent from a computer.

5. The color printing apparatus according to claim 1, wherein for multiple pages of printout, each page color is defined, in advance, by setting color information by manual means.

6. The color printing apparatus according to claim 1, wherein for multiple units of printout, each unit color is defined, in advance, by setting color information for each defined unit by manual means.

7. A color printing apparatus for printing information data as well as overlay data comprising:

data receiving means for receiving information data in a series of pages;

manual overlay color input means for manually inputting a plurality of printing colors of overlay data, each printing color respectively being assigned to a page number or a drawing object, before information data in the series of pages are printed; and printing means for printing overlay data of each page or the drawing object in a color assigned by said manual overlay color input means, and for printing the information data received by said data receiving means.

8. The color printing apparatus according to claim 7, wherein the information data is sent from a host.

9. The color printing apparatus according to claim 7, wherein said printing means includes a printer engine for printing characters.

10. A color printing apparatus according to claim 7, wherein said manual overlay color input means includes a panel for manually inputting.

11. A method of printing overlay data as well as character data comprising:

a step of manually inputting colors as overlay print colors, each color respectively being assigned to a page number or a drawing object;

a step of receiving print data in a series of pages; and a step of printing overlay data of each page or the drawing object in the assigned color and the received print data.

12. The method according to claim 11, wherein the print data is sent from a host.

13. The method according to claim 11, wherein said printing is performed by a printer engine for printing characters.

14. The method according to claim 11, wherein said manually inputting is performed through a panel.

15. A method of printing information data, comprising the steps of:

manually setting in a color information table printing color information of data to be received and printed;

receiving data and a color mode flag;

judging a state of the color mode flag; and switching a print of the received data in a color designated by color information included in the received data or in a color designated by color information set in the color information table, in accordance with the judged state of the color mode flag.

16. The method according to claim 15, wherein said manually color information setting step includes the step of setting the color information in page units.

17. The method according to claim 15, wherein said manually color information setting step includes the step of setting a manually set color information in defined units.

18. The method according to claim 15, wherein said manually color information setting is performed by a step of actuating a panel switch.

19. The method according to claim 15, wherein for multiple pages of printout, each page color is defined, in advance, by setting color information by manual means.

20. The method according to claim 15, wherein for multiple units of printout, each unit color is defined, in advance, by setting color information by manual means.

* * * * *

UNITED STATES PATENT AND TRADEMARK OFFICE
CERTIFICATE OF CORRECTION

PATENT NO. : 5,598,513
DATED : January 28, 1997
INVENTOR(S) : Katsuhiko Anzai

It is certified that error appears in the above-indentified patent and that said Letters Patent is hereby corrected as shown below:

COLUMN 2

Line 61, "show" should read --shows--.

COLUMN 3

Line 30, "which" should be deleted.

COLUMN 4

Line 7, "RAM a 53" should read --a RAM 53--.

COLUMN 7

Line 24, "is" should read --are--.

Signed and Sealed this

Twenty-fourth Day of June, 1997

Attest:

BRUCE LEHMAN

Attesting Officer     Commissioner of Patents and Trademarks